(12) United States Patent
Tewinkle

(10) Patent No.: US 7,893,977 B2
(45) Date of Patent: Feb. 22, 2011

(54) MULTIPLEXING AND OFFSET CORRECTION SYSTEM FOR AN IMAGE SENSOR ARRAY

(75) Inventor: Scott L Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 352 days.

(21) Appl. No.: 11/877,069

(22) Filed: Oct. 23, 2007

(65) Prior Publication Data

US 2009/0102954 A1 Apr. 23, 2009

(51) Int. Cl.
- H04N 5/217 (2006.01)
- H04N 3/14 (2006.01)
- H04N 5/335 (2006.01)
- H04N 1/04 (2006.01)

(52) U.S. Cl. ........... 348/294; 348/241; 348/302; 348/308; 358/482

(58) Field of Classification Search .......... 348/294, 348/302, 308, 315, 241; 382/482, 483
See application file for complete search history.

(56) References Cited

U.S. PATENT DOCUMENTS

| | | | |
|---|---|---|---|
| 4,500,927 A * | 2/1985 | Ozawa | 358/482 |
| 4,788,445 A * | 11/1988 | Hatanaka et al. | 358/482 |
| 5,638,121 A | 6/1997 | Hosier et al. | |
| 5,694,495 A * | 12/1997 | Hara et al. | 382/324 |
| 6,144,466 A * | 11/2000 | Mizutani et al. | 358/482 |
| 6,249,618 B1 * | 6/2001 | Hou | 382/312 |
| 6,445,413 B1 | 9/2002 | Hosier et al. | |
| 6,476,864 B1 * | 11/2002 | Borg et al. | 348/245 |
| 6,606,172 B1 * | 8/2003 | Moro | 358/483 |
| 6,747,700 B1 * | 6/2004 | Funakoshi et al. | 348/308 |
| 6,803,952 B1 * | 10/2004 | Watanabe | 348/241 |
| 6,853,402 B2 * | 2/2005 | Hosier et al. | 348/241 |
| 7,002,713 B2 * | 2/2006 | Fukawa | 358/483 |
| 7,084,912 B2 * | 8/2006 | Chieh | 348/245 |
| 7,129,461 B2 * | 10/2006 | Zarnowski et al. | 250/208.1 |
| 7,408,683 B2 * | 8/2008 | Sato et al. | 358/474 |
| 7,459,667 B1 * | 12/2008 | Lee et al. | 250/214 R |
| 2004/0032628 A1 * | 2/2004 | Sato et al. | 358/514 |
| 2004/0125421 A1 * | 7/2004 | Sato | 358/513 |
| 2005/0206757 A1 * | 9/2005 | Itoh | 348/294 |
| 2006/0043261 A1 * | 3/2006 | Matsuda et al. | 250/208.1 |
| 2007/0183006 A1 * | 8/2007 | Lee | 358/513 |
| 2007/0229686 A1 * | 10/2007 | Hiyama et al. | 348/294 |
| 2007/0229687 A1 * | 10/2007 | Hiyama et al. | 348/294 |
| 2008/0309800 A1 * | 12/2008 | Olsen et al. | 348/241 |
| 2008/0309809 A1 * | 12/2008 | Cieslinski | 348/308 |
| 2009/0009642 A1 * | 1/2009 | Joshi et al. | 348/301 |

* cited by examiner

Primary Examiner—David L Ometz
Assistant Examiner—Richard Bemben
(74) Attorney, Agent, or Firm—Simpson & Simpson, PLLC

(57) ABSTRACT

An imaging apparatus includes two subsets of photosensors, the two subsets being interleaved along a linear array. Each photosensor is connectable, by the operation of a shift register, to a reference line and a signal line, to permit double-sampling of signals therefrom. Each subset of photosensors is associated with its own reference line and signal line, and signals from the two subsets of photosensors can be read out largely simultaneously.

9 Claims, 3 Drawing Sheets

MULTIPLEXING AND OFFSET CORRECTION SYSTEM FOR AN IMAGE SENSOR ARRAY

INCORPORATION BY REFERENCE

The present application incorporates by reference U.S. Pat. Nos. 5,638,121; 6,445,413; and 6,853,402, all assigned to the assignee hereof, each in its entirety.

TECHNICAL FIELD

The present invention relates to image sensor arrays such as used in raster input scanners or digital copiers. In particular, the invention relates to photosensitive chips wherein photosensors output signals onto a video line.

BACKGROUND

Image sensor arrays typically comprise a linear array of photosensors which raster scan an image-bearing document and convert the microscopic image areas viewed by each photosensor to image signal charges. Following an integration period, the image signal charges are amplified and transferred as an analog video signal to a common output line or bus through successively actuated multiplexing transistors.

Although most scanning systems currently in use are ultimately digital systems, the "raw signal" coming out of the photosensors during the scanning process is an analog video signal, with the voltage magnitude corresponding to the intensity of light impinging on the photosensor at a given time. Thus, when signals are read out from the photosensors on a chip to be converted to digital data, different video levels, corresponding to the brightness of the reflected area being scanned by a particular photosensor at a particular moment, are output as a series of analog voltage levels.

In order to increase the readout speed of image signals from, for example, a linear array of photosensors, it is known to provide separate "odd" and "even" channels for the output of image signals. A basic example of this technique is shown in U.S. Pat. No. 5,638,121. In brief, alternate photosensors along a linear array respectively output image signals into separate odd and even video lines, and these video lines are subsequently multiplexed, thus yielding a single video stream.

FIG. 1 is a schematic view showing the basic elements of a readout system according to a prior-art implementation, illustrating an "odd-even" readout principle. There is provided on, for instance, a photosensor chip, a set of photosensors 10a-10z, which are connected by respective transistor switches 14a, 14b, etc. The switches in turn are activated by a shift register 18, which includes a set of stages (or, more precisely in the embodiment, half-stages) 20a, 20b, etc., arranged along a single line 22, and activated by a pixel clock line 24. When a digital 1 is passed through the stages 20a, 20b, etc., signals held on the photosensors 10a ... 10z are caused to be read out of the system in linear order, to form a line of useable image data, such as for a digital scanner or copier.

According to this FIG. 1 example, the photosensors 10a .. . 10z are arranged in an interleaved manner with odd and even subsets, with the odd subsets of photosensors such as 10a and 10c connected to an odd video line 12a, and the even photosensors such as 10b and 10d, connected to an even video line 12b. Video line 12a receives the video outputs only of the odd photosensors, and the even video line 12b receives the video outputs only of the even photosensors. Because both the odd and even photosensors are controlled by a single shift register 18, having half-stages 20a, 20b, etc., the video voltage signals from a set of odd and even pixels can together be read out onto the odd and even video lines at a considerably faster rate than in a situation where all of the photosensors are reading out to a single video line. Another practical advantage is that, because fewer transistors are connected to each of the odd and even lines, there is less capacitance on each line than if both odd and even signal trains were read out on one line, and each video signal can settle to its final value faster.

With any sophisticated system for reading out images signals from a series of photosensors, a common practical problem is known as "dark non-uniformity" (DNU) or "fixed-pattern noise." With each individual photosensor for an associated transfer circuit, there is likely to be a single dedicated amplifier (a "pixel amplifier"). Given the practicalities of constructing photosensors and circuits on a chip, it is likely that certain amplifiers, associated with certain photosensors, will consistently have higher output relative to other amplifiers associated with other photosensors. DNU is defined as the maximum difference in output voltage between any two pixels of an image sensor while in the dark. There exist basic techniques for overcoming DNU, such as mentioned in U.S. Pat. No. 5,654,755.

"Double sampling" is a technique that can be used to reduce the DNU contribution of the pixel amplifier. With this concept, the output of each pixel amplifier is sampled twice, once with the optical signal from the photosensor such as 10a and once with a common reference signal, so that the output signal from the pixel is defined as the difference between the two samples. Additional signal processing stitches the video back together and restores the output level. If the pixel amplifier offset is constant, the subtraction of the double samples, to the first order, eliminates its contribution to DNU. However, the problem with doing double sampling in a standard architecture is that the pixel amplifier is read out twice to the same video line, which effectively reduces the output data rate by 50%.

The present disclosure relates to a photosensor circuit architecture that enables double sampling of video outputs without a necessary decrease in output data rate.

SUMMARY

According to one aspect, there is provided an imaging apparatus, comprising a first subset of photosensors, and a second subset of photosensors. A plurality of pixel amplifiers is provided, at least one pixel amplifier being associated with each photosensor in the first subset of photosensors and the second subset of photosensors. A shift register includes a plurality of stages, at least one of the plurality of stages associated with each photosensor in the first subset of photosensors and the second subset of photosensors. A first reference line is associated with the first subset of photosensors, and is configured to read a reference signal associated with each pixel amplifier associated with the first subset of photosensors. A first signal line is associated with the first subset of photosensors, and is configured to read a signal associated with each pixel amplifier associated with the first subset of photosensors. A second reference line is associated with the second subset of photosensors, and is configured to read a reference signal associated with each pixel amplifier associated with the second subset of photosensors. A second signal line is associated with the second subset of photosensors, and is configured to read a signal associated with each pixel amplifier associated with the second subset of photosensors.

As used in the below description, and notwithstanding other or additional labeling of elements in the Figures, the convention "pixel N" will mean a given photosensor and associated circuitry, while, for instance, "pixel N+1" will mean an adjacent photosensor and circuitry along a readout direction of the linear array, "pixel N−2" will mean two photosensors upstream along a readout direction of the linear array, etc.

DETAILED DESCRIPTION

To implement "double sampling" without affecting output data rate, the disclosure proposes splitting the odd and even video lines into signal and reference pairs.

Figure 1:
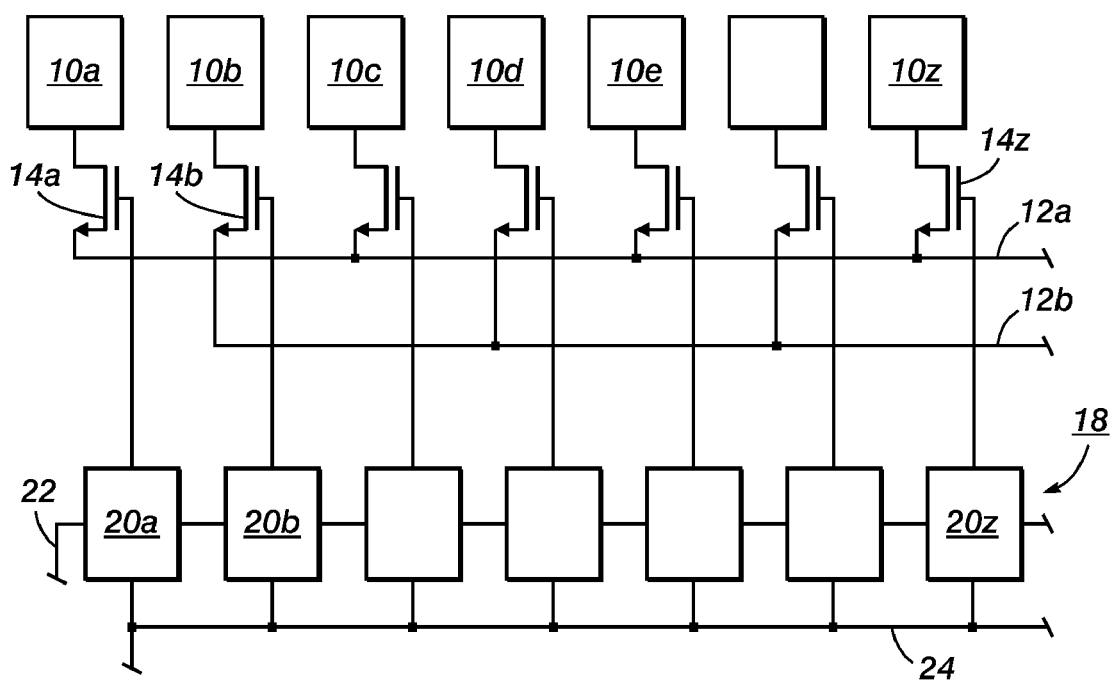
FIG. 1 is a schematic view showing the basic elements of a readout system according to a prior-art implementation, illustrating an "odd-even" readout principle.
Figure 2:
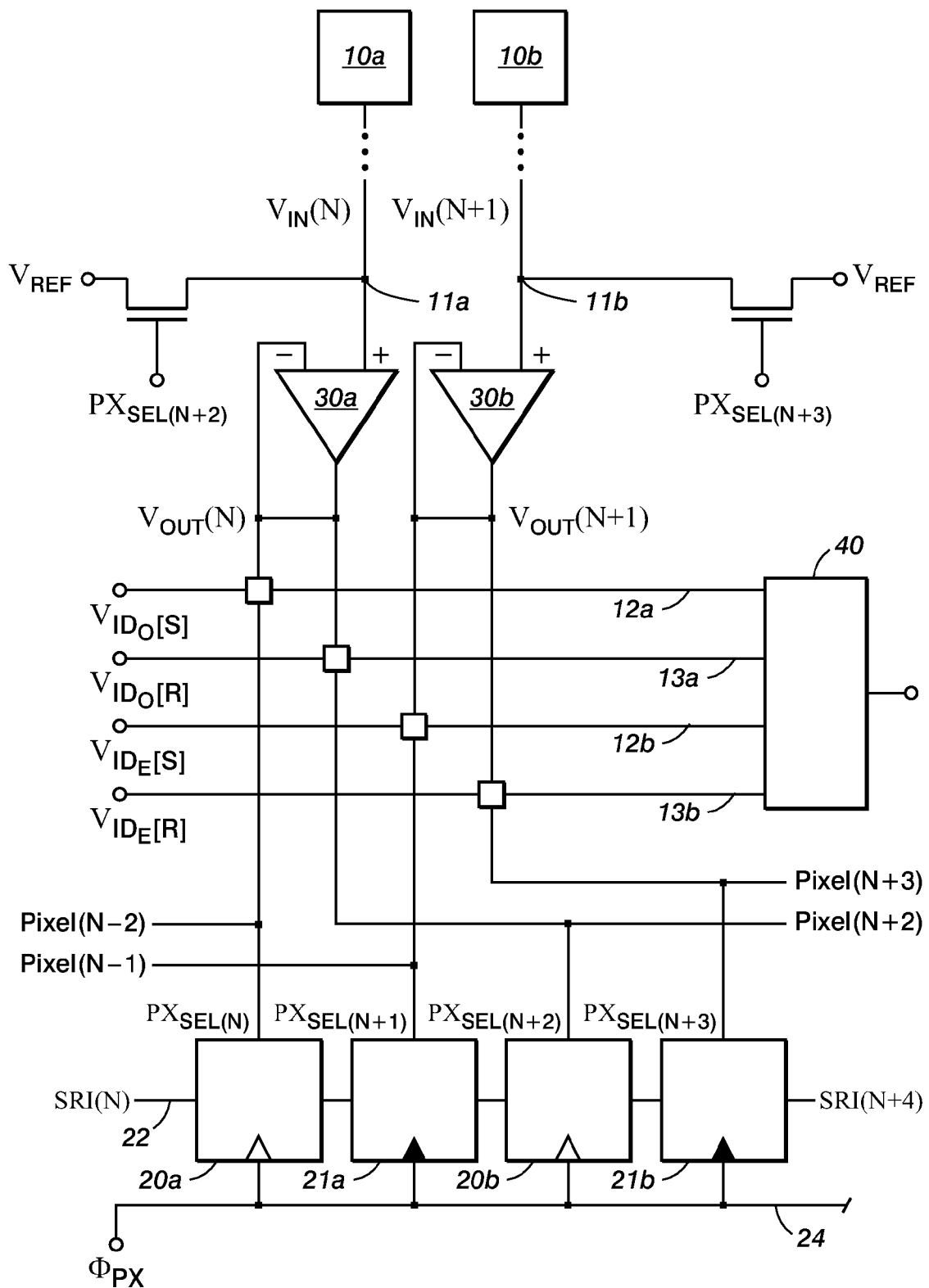
FIG. 2 is a detailed schematic view showing circuitry associated with two adjacent photosensors in an embodiment.

FIG. 2 is a detailed schematic view showing circuitry associated with two adjacent photosensors. such as 10a and 10b in FIG. 1, in an embodiment: between FIG. 1 and FIG. 2, equivalent elements have the same reference number. In a practical implementation of the FIG. 2 structure, the photosensors 10a and 10b would respectively represent a single "odd" and a single "even" photosensor, as those two types of photosensors would be interleaved along a long linear array having hundreds or thousands of photosensors.

In FIG. 2, each photosensor 10a and 10b sends an exposure-based charge (perhaps through a transfer circuit, not shown) to a respective reset node 11a, 11b. In addition to the photosensor 10a or 10b and associated shift register stage (or, more specifically in this embodiment, half-stages) 20a, 20b, there is provided in the FIG. 2 embodiment a unity-gain pixel amplifier 30a, 30b, as well as an additional shift register stage 21a, 21b, for each photosensor.

Associated with the photosensors are what can be generally called "readout lines" indicated as $VID_O[S]$ and $VID_O[R]$, associated with all odd photosensors such as 10a; and $VID_E[S]$ and $VID_E[R]$, associated with all even photosensors such as 10b. These readout lines have the same overall function of reading out image-based signals, as described above in regard to lines 12a and 12b in FIG. 1. However, these two lines per photosensor are configured to carry out a "double sampling" of each pixel readout from each photosensor. As mentioned above, with double sampling, the output of each pixel amplifier is sampled twice, once with the optical signal from the photosensor such as 10a and once with a common reference signal, so that the output signal from the pixel is defined as the difference between the two samples.

Taking photosensor 10a as an example, the lines $VID_O[S]$ and $VID_O[R]$ are configured relative to the unity-gain pixel amplifier 30a to facilitate double sampling. The "reference" line $VID_O[R]$, tapped to the output of pixel amplifier 30a, effectively receives and outputs a reference signal relating to the "dark" output from pixel amplifier 30a, i.e., the signal output from pixel amplifier 30a when there is no signal from the associated photosensor 10a. The "signal" line $VID_O[S]$, tapped between the pixel select line from shift register stage 20a and the negative input to pixel amplifier 30a, reads an optical-signal output from the pixel amplifier 30a (based ultimately on the image-based charge for photosensor 10a at a given time). As can be seen, the lines $VID_O[S]$ and $VID_O[R]$ associated with pixel amplifier 30a are respectively connected to certain stages in the shift register, for activation when a shift register signal passes through the system along line 22.

To effect the double sampling operation, the line $VID_O[R]$, when activated via shift register stage 20b, outputs a reference signal relating to the "dark" output from pixel amplifier 30a. The line $VID_O[S]$, when activated via shift register stage 20a, reads an optical-signal output from the pixel amplifier 30a. When the reference signal from line $VID_O[R]$ is subtracted from the optical-signal output on line $VID_O[S]$, the remainder represents a signal in which the dark non-uniformity (DNU) associated with that particular pixel amplifier 30a is subtracted out.

In the illustrated embodiment, the readout sequence over time for each pair of photosensors such as shown in FIG. 2, as a shift register signal passes through the shift register stages 20a, 21a, 20b, 21b, is: S(odd pixel), S(even pixel), R(odd pixel), R(even pixel). To carry out this readout, any pair of odd and even photosensors such as 10a and 10b, with their respective associated amplifiers 30a and 30b, interact with connections to two photosensors in either direction (pixels N and N+1 with pixels (N−2 and N+2) and (N−1 and N+3), respectively). Thus, in further detail, the $PX_{SEL}$ output of the shift register stage such as 20a of pixel (N) will connect the signal output of the pixel amplifier 30a to the signal video line and the reference signal of pixel (N−2) to the reference video line. The $PX_{SEL}$ of pixel (N+2) will then connect the reference output of the pixel amplifier from pixel (N) to the reference video line. The video line pairs and second video line switch allow two odd pixels and two even pixels to be sampled simultaneously. As a result, "double sampling" with the embodiment will not double the readout time or correspondingly reduce the output data rate.

Cumulatively, the DNU for each individual pixel amplifier in the array is thus removed with each signal readout. The subtraction operation between $VID_O[S]$ and $VID_O[R]$ for each pixel in each readout operation is carried out by a downstream system including specialized circuitry and/or software, generally shown as 40, which also performs the necessary multiplexing of the odd and even signals. As in the embodiment described in U.S. Pat. No. 5,638,121, the downstream video path is required to do additional processing to stitch and restore the video; but there are no additional logic gates required because the $PIX_{SEL}$ signals from the shift register stages can be used directly and do not need to be conditioned by a pixel clock. As a result, there is minimal impact to the width of the sensor chip even with the second video line switch for each pixel and the two additional video lines for the pixel array.

Figure 3:
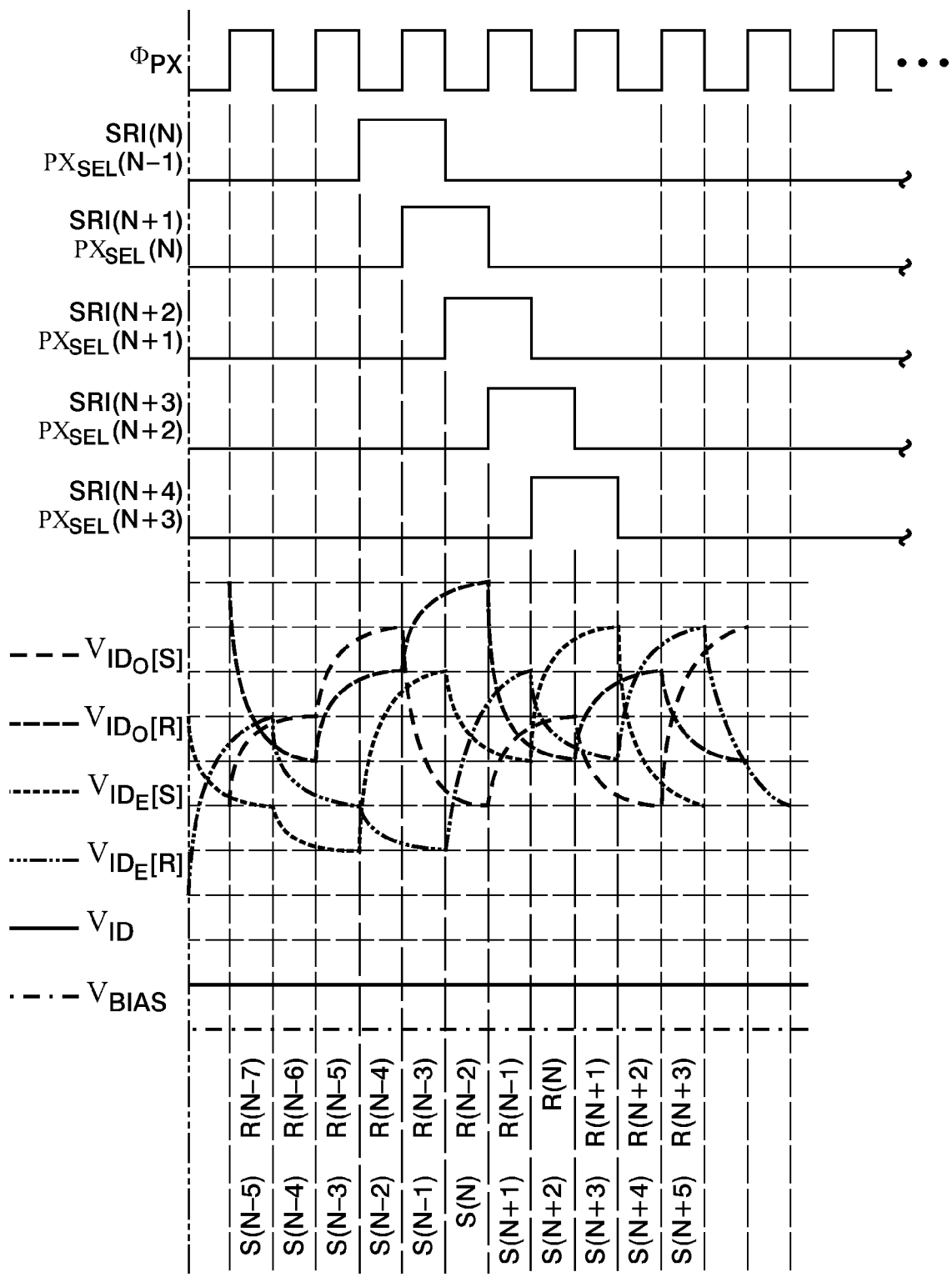
FIG. 3 is a functional timing diagram, with a typical output response, for the various lines as labeled in FIG. 2, as the apparatus of FIG. 2 is operated. The various signal forms in FIG. 3 are labeled to correspond to similarly-labeled nodes in the FIG. 2 circuit, even though not all such labeled nodes are described in the below text.

FIG. 3 is a functional timing diagram, with a typical output response, for the various lines as labeled in FIG. 2, as the apparatus of FIG. 2 is operated via a succession of signals passing through the series of shift register stages 20a, 21a, 20b, 21b, etc.

In combination with analogous hardware and control associated with the even photosensors such as photosensor 10b, the signal line $VID_E[S]$ and reference line $VID_E[R]$ configured relative to the unity-gain pixel amplifier such as 30b, etc., there is thus provided a system by which separate signal and reference lines, through which double sampling is possible, are provided for separate subsets of photosensors and associated pixel amplifiers. Because the "odd" and "even" subsets can be read out simultaneously, the double sampling, which largely obviates DNU from the whole apparatus, is enabled without impacting the overall readout rate (as is common in double-sampling arrangements) and also has impact on "real estate" on a photosensor chip is minimal.

Although the above-described embodiment is shown in the context of a linear array of photosensors as would be used in a digital copier or scanner, the teachings herein can readily be adapted for use in a two-dimensional photosensor array. Although the color aspects of the described embodiment are not discussed, the teachings herein can readily be adapted for a full-color device. Although the described embodiment shows "odd" and "even" subsets of photosensors along an array, interleaved on a one-by-one basis, the terms "odd" and "even" shall be construed broadly to encompass any arrangement of subsets of photosensors in a device, no matter to what extent the photosensors in the subsets are interleaved 9 (e.g., the two subsets could be entirely separate from each other on the chip). The teachings can also be adapted for embodiments in which there are more than two subsets of photosensors in an apparatus (e.g., the outputs of four subsets of photosensors could be multiplexed, to increase the readout rate).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An imaging apparatus, comprising:
a first subset of photosensors, and a second subset of photosensors;
a plurality of pixel amplifiers, with exactly one pixel amplifier being independently associated with each photosensor in the first and second subsets of photosensors;
a shift register comprising a plurality of stages, at least one stage of the plurality of stages associated with each photosensor in the first subset of photosensors and the second subset of photosensors;
a first reference line, associated with the first subset of photosensors, configured to read a reference signal associated with each pixel amplifier associated with the first subset of photosensors;
a first signal line, associated with the first subset of photosensors, configured to read a signal associated with each pixel amplifier associated with the first subset of photosensors, wherein said first signal line is separate from said first reference line;
a second reference line, associated with the second subset of photosensors, configured to read a reference signal associated with each pixel amplifier associated with the second subset of photosensors; and
a second signal line, associated with the second subset of photosensors, configured to read a signal associated with each pixel amplifier associated with the second subset of photosensors, wherein said second signal line is separate from said second reference line;
wherein a first stage of the shift register is operatively connected to a first photosensor and a second photosensor, said first photosensor in said first plurality of photosensors, and said second photosensor in said first plurality of photosensors, for simultaneously sampling a first image signal from said first photosensor and a first reference signal from said second photosensor.

2. The apparatus of claim 1, further comprising a downstream system for obtaining a difference between signals on the first reference line and first signal line, and between signals on the second reference line and second signal line.

3. The apparatus of claim 1, further comprising a downstream system for multiplexing signals associated with the first reference line, first signal line, second reference line, and second signal line.

4. The apparatus of claim 1, wherein the shift register is arranged with the first reference line, first signal line, second reference line, and second signal line so that the lines read out, in time sequence, a signal from a photosensor in the first subset, a signal from a photosensor in the second subset, a reference signal associated with a photosensor in the first subset, and a reference signal associated with a photosensor in the second subset.

5. The apparatus of claim 1, the first reference line being tapped to the outputs of each of the pixel amplifiers associated with the first subset of photosensors, and the second reference line being tapped to the outputs of each of the pixel amplifiers associated with the second subset of photosensors.

6. The apparatus of claim 1, the first subset of photosensors being interleaved with the second subset of photosensors along a linear array.

7. The apparatus of claim 1 wherein a second stage of the shift register is operatively connected to a third photosensor and a fourth photosensor, said third photosensor in said second plurality of photosensors, and said fourth photosensor in said second plurality of photosensors, for simultaneously sampling a second image signal from said third photosensor and a second reference signal from said fourth photosensor.

8. An imaging apparatus, comprising:
a first subset of photosensors, and a second subset of photosensors;
a plurality of pixel amplifiers, with exactly one pixel amplifier being independently associated with each photosensor in the first and second subsets of photosensors;
a shift register comprising a plurality of stages, at least one stage of the plurality of stages associated with each photosensor in the first subset of photosensors and the second subset of photosensors;
a first reference line, associated with the first subset of photosensors, configured to read a reference signal associated with each pixel amplifier associated with the first subset of photosensors;
a first signal line, associated with the first subset of photosensors, configured to read a signal associated with each pixel amplifier associated with the first subset of photosensors, wherein said first signal line is separate from said first reference line;
a second reference line, associated with the second subset of photosensors, configured to read a reference signal associated with each pixel amplifier associated with the second subset of photosensors; and
a second signal line, associated with the second subset of photosensors, configured to read a signal associated with each pixel amplifier associated with the second subset of photosensors, wherein said second signal line is separate from said second reference line;
wherein a first stage of the shift register is operatively connected to a first pixel amplifier and a second pixel amplifier, said first pixel amplifier associated with a first photosensor, said first photosensor in said first plurality of photosensors, and said second pixel amplifier associated with a second photosensor, said second photosensor in said first plurality of photosensors, for simultaneously sampling a first image signal from said first pixel amplifier and a first reference signal from said second pixel amplifier.

9. The apparatus of claim 8 wherein a second stage of the shift register is operatively connected to a third pixel amplifier and a fourth pixel amplifier, said third pixel amplifier associated with a third photosensor, said third photosensor in said second plurality of photosensors, and said fourth pixel amplifier associated with a fourth photosensor, said fourth photosensor in said second plurality of photosensors, for simultaneously sampling a second image signal from said third pixel amplifier and a second reference signal from said fourth amplifier.

* * * * *